United States Patent

Womack et al.

[11] Patent Number: 5,090,506
[45] Date of Patent: Feb. 25, 1992

[54] ADJUSTABLE HUNTER'S TREE STAND

[76] Inventors: Cleve W. Womack, 200 Eighth St.;
Renard R. McGuffee, 1021 Highway
8 West, both of Jonesville, La. 71343

[21] Appl. No.: 673,309

[22] Filed: Mar. 22, 1991

[51] Int. Cl.⁵ ............................................ A01M 31/02
[52] U.S. Cl. ..................................... 182/187; 108/152
[58] Field of Search ............... 182/187, 188, 134, 135; 108/152

[56] References Cited

U.S. PATENT DOCUMENTS

| | | | |
|---|---|---|---|
| 1,187,078 | 6/1916 | May | 182/187 |
| 2,991,842 | 7/1961 | Hardin | 182/187 |
| 3,460,649 | 8/1969 | Baker et al. | 182/187 |
| 3,485,320 | 12/1969 | Jones | 182/129 |
| 3,885,649 | 5/1975 | Dameron | 182/187 |
| 4,321,982 | 3/1982 | Strickland | 182/20 |
| 4,726,447 | 2/1988 | Gibson | 182/187 |
| 4,995,475 | 2/1991 | Berkbuegler | 182/187 |
| 4,997,063 | 3/1991 | Bradley | 182/187 |

Primary Examiner—Reinaldo P. Machado
Attorney, Agent, or Firm—David L. Ray

[57] ABSTRACT

A hunter's tree stand which is adjustable to fit tree trunks of various diameters including a platform for supporting a hunter in the standing or sitting position, the platform having a rear edge for gripping a tree trunk, a pair of frame members for straddling a tree trunk connected to the platform, a blade member for gripping a tree trunk, and a rod for moving the blade member away from and toward a tree trunk, the rod being connected to the frame members and the blade member.

20 Claims, 3 Drawing Sheets

ADJUSTABLE HUNTER'S TREE STAND

BACKGROUND OF THE INVENTION

1. Field of the Invention

The present invention is related to hunter's platforms or stands which are connected to trees upon which the hunter can stand or sit.

2. Description of the Related Art

Hunter's tree stands are well known in the art. Tree stands are platforms connected to trees at a desired elevation above the ground upon which the hunter stands or sits while waiting for game to come within gun or bow and arrow range. Naturalists, photographers, and film makers also use tree stands.

Exemplary of the tree stands of the prior art are the following U.S. Patents:

U.S. Pat. No. 4,321,982, discloses a tree climbing-hunting and game cart device which is a platform used to climb a tree to an elevated position. A means is connected to the platform to latch it in a secure position so that a hunter may sit or stand on the platform in a hunting position. In a second use of the device, a forward v-shaped tree gripping portion of the platform is flipped over and carries a part of wheels at one end thus to provide a wheeled platform and cart arrangement for removing game from the forest.

U.S. Pat. No. 3,885,649 discloses a hunter's tree stand in which a generally horizontal support platform including opposite inner and outer ends is provided and an elongated brace structure has one end thereof pivotally supported from the outer end portion of the platform for swinging relative to the latter about an axis extending transversely of the brace structure and the platform between a first collapsed position with the brace structure closing underlying and substantially paralleling the platform and the other end of the brace structure projecting outwardly of the inner end of the platform and a second operative position with the other end of the brace structure inclined downwardly from the platform at an angle between 30 and 60 degrees relative to the latter and terminating downwardly in generally vertical alignment with the inner end of the platform. An elongated flexible tether structure is anchored to the inner end of the platform and may be secured about a tree trunk against which the inner end of the platform is abutted. Further, the other or free end of the brace structure includes bar penetrating structure for the fictionally engaging and biting into a portion of the tree trunk against which the inner end of the platform is abutted spaced below the platform.

U.S. Pat. No. 3,485,320 discloses a portable deer stand which is a device for climbing a vertical object, such as a tree, to provide an elevated platform for a hunter, or any other person. The device consists of a platform and a frame above the platform, each being provided with an angled clamping yoke, the trunk of a tree or other vertical object being clampingly-engageable between the clamping yokes and the adjacent portions of the platform and frame. The bight portions of the yokes are connected by a nonelastic flexible strap to limit the vertical separation of the bight portions. Elastic straps are provided near the forward ends of the platform and frame, being connected therebetween when the device is to be used for climbing a tree, or other vertical object. These side elastic straps are disconnected when he device is to be used for descending. Another elastic strap is provided at the outer edge of the platform and is adapted to be connected to the outer portion of the frame when the device is to be used for descending. When the device is arranged for climbing by alternating his weight between the upper yoke and the platform, a person can cause the device to climb up the tree, or other vertical object embraced thereby. By detaching the side elastic straps and by connecting the outward elastic strap, the device can be similarly operated to descend the tree, or other vertical object.

U.S. Pat. No. 3,460,649 discloses a tree climbing-hunting platform device which has a base plate adapted to be positioned substantially horizontally against the side of a tree; with a V-shaped blade extending from the rear edge of the plate adapted to bite into the tree. Angularly disposed frame members extend upwardly and rearwardly from the front end of the plate beyond the said blade; and a second V-shaped blade is removably and adjustably secured to the rear ends of the frame members and has a sharpened inner edge adapted to bit into the opposite side of the tree from the first blade. The blades embracing the tree therebetween at different elevations; and a foot strap is secured upon the top of the plate adapted to overlie the feet of a person standing on the plate; while facing the tree, so that the person by placing his arms around the tree and pulling upwardly with his feet may climb the tree thereby raising the plate with respect to the tree, the plate remaining self-supporting in raised position whenever the weight of the person is again distributed on the plate.

U.S. Pat. No. 2,991,842 discloses a portable seat or the like comprising a flat seat plate having first and second ends and opposed side edges, a post receiving cutout in said firs end, an elongated flexible member having a first end connected to the seat plate at a point located near one side edge and spaced from the ends of the plate, said member having an intermediate post embracing portion, said member having a second free end, and means on the seat plate located at a point near the other side edge and spaced from the ends of the plate for securing the free end of the said member to the seat plate in length adjusted condition, said cutout having post indenting means therealong, consisting of a sharp edge.

U.S. Pat. No. 1,187,078 discloses a portable pole platform, including a foot board; brackets extending outward from said foot board on opposite sides of the pole; side bars hinged to said brackets and adapted to stop at substantially a right angle to said brackets; a spiked, curved strap between said brackets adjacent to said foot board; a spiked cross bar connected to said side bars on the opposite side of the pole from said foot board; and a bridle connected to said side bars on the foot board side of said pole.

SUMMARY OF THE INVENTION

In accordance with the present invention there is provided a hunter's tree stand which is adjustable to fit tree trunks of various diameters including a platform for supporting a hunter in the standing or sitting position, the platform having a rear edge for gripping a tree trunk, a pair of frame members for straddling a tree trunk connected to the platform, a blade member for gripping a tree trunk, and a rod for moving the blade member away from and toward a tree trunk, the rod being connected to the frame members and the blade member.

The present invention has the advantage of being attachable to trees of many different diameters. Utilizing two of the stands of the invention, the hunter can climb a tree which has a large diameter base and a much smaller diameter at the level at which the hunter secures the stand. The bight member can be quickly and easily moved toward, and away from, the platform by rotating the threaded rotatable rods to adjust the stand to fit various tree trunk diameters.

BRIEF DESCRIPTION OF THE DRAWINGS

The invention will be more easily understood by reference to the drawings in which.

DESCRIPTION OF THE PREFERRED EMBODIMENTS

Figure 1:
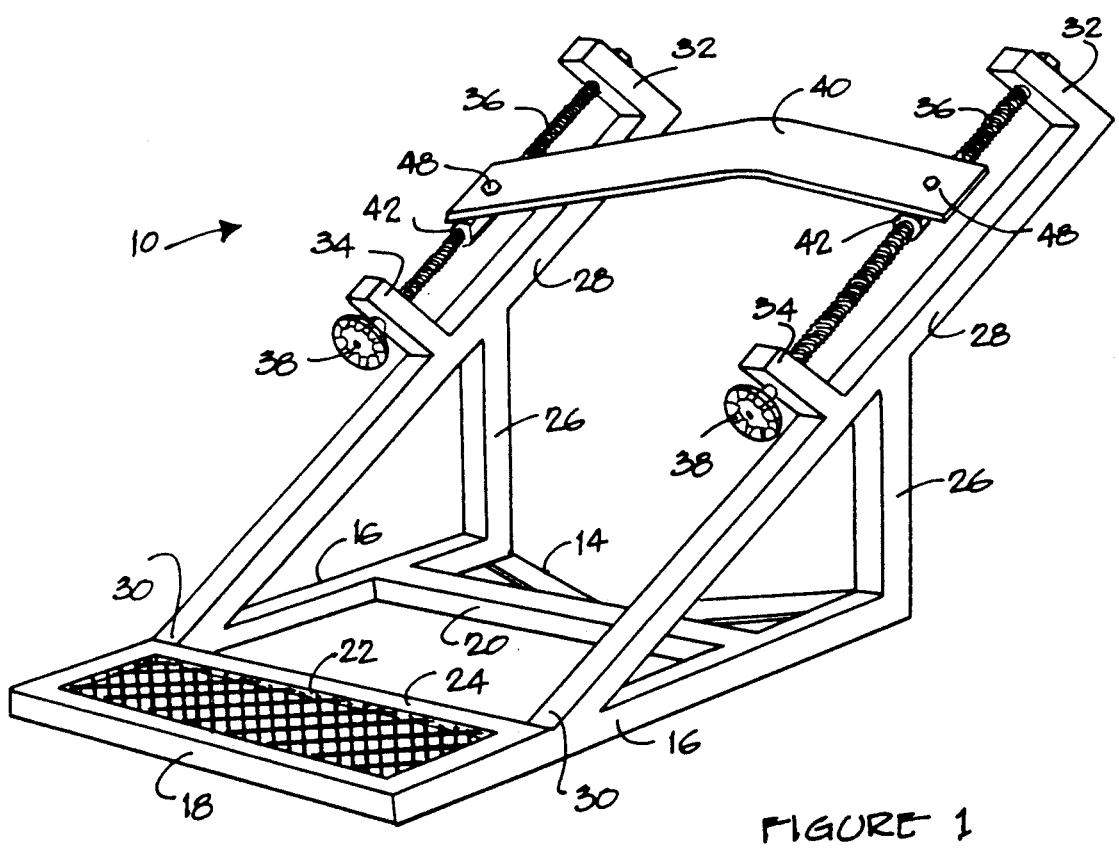
FIG. 1 is a perspective view of the adjustable hunter's tree stand of the invention.

Referring now to the drawings, the tree stand of the invention is generally indicated by the numeral 10. Tree stand 10 has a platform 12 which is generally rectangular in shape and has a generally V-shaped rear edge 14. Rear edge 14 is preferably constructed from a flat metal plate so that the rear edge will bite into and firmly grip a tree on which the stand is mounted.

Platform 12 has two straight parallel side members 16—16 connected by a straight transverse front edge member 18. Located adjacent to V-shaped rear edge 14 is transverse rear member 20 which is connected at its middle by welding or the like to the middle of V-shaped rear edge 14. Transverse member 20 also connects at each end to straight parallel side members 16—16.

Connected to front edge 18 and side members 16—16 is grating or floor 22 upon which the hunter can sit or stand. Floor 22 is also connected to inner transverse member 24. Inner transverse member 24 can be located at any desired position along side members 16—16. If desired, inner transverse member 24 could be eliminated and grating or floor 22, could extend from front edge 18 to transverse rear member 20 and to side members 16—16.

Preferably, grating or floor 22 is an expanded metal grating to keep the weight of the tree stand at a minimum. However, if desired, floor 22 could be a solid sheet of metal, reinforced thermoplastic such as glass fiber reinforced polyvinyl chloride or the like, or a solid sheet of wood such as plywood.

Figure 2:
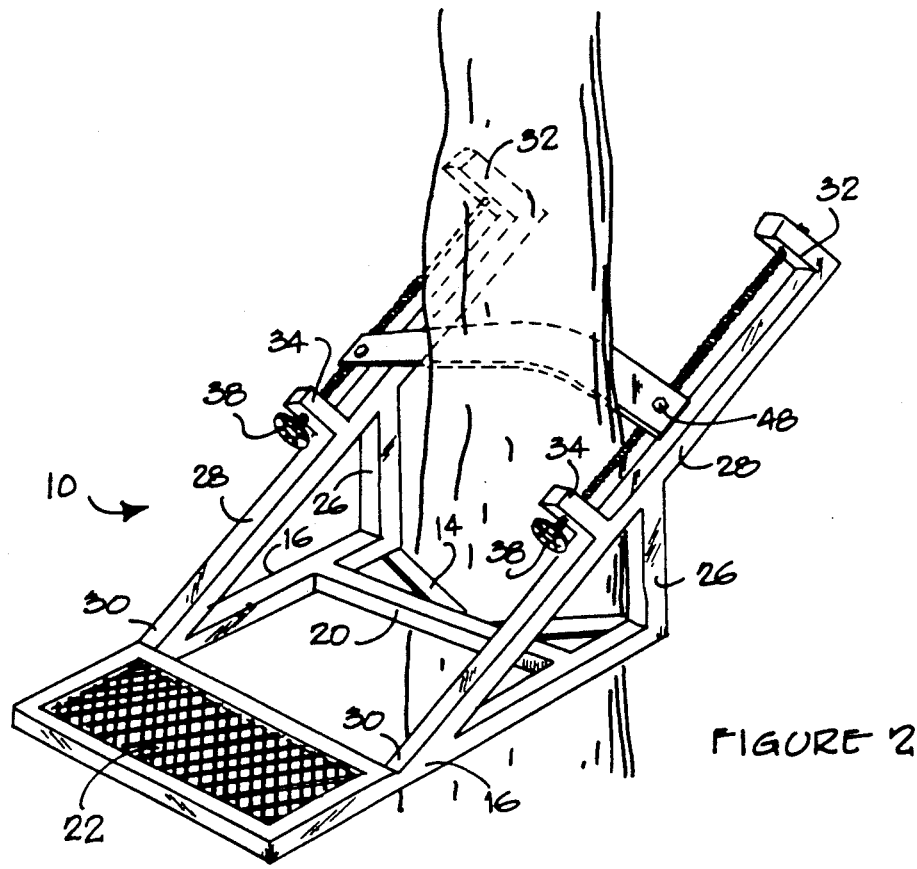
FIG. 2 is a perspective view of the adjustable hunter's tree stand of the invention connected to a tree of smaller diameter.
Figure 3:
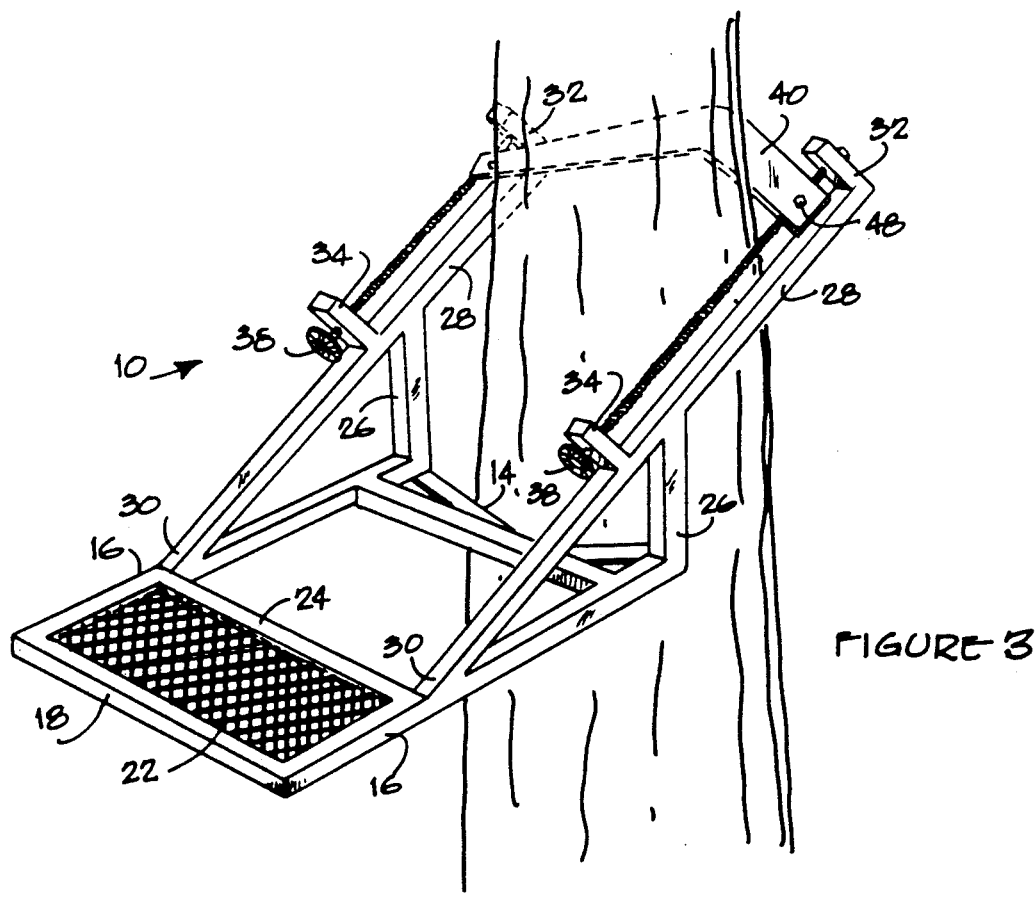
FIG. 3 is a perspective view of the adjustable hunter's tree stand of the invention connected to a tree of larger diameter.
Figure 4:
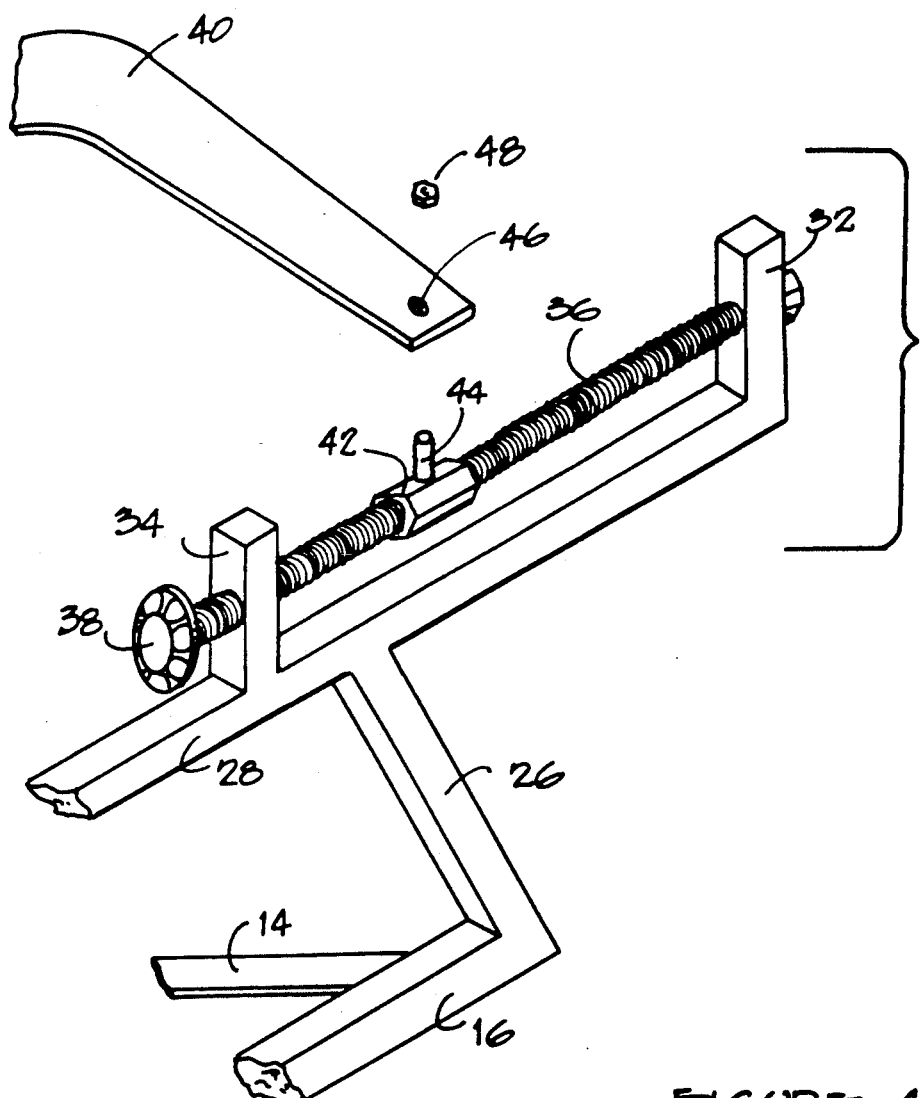
FIG. 4 is a partly cut-away, exploded, detailed, perspective view of the threaded rotatable rod and threaded sleeve of the invention.

Extending vertically upward from side members 16—16 are two vertical members 26—26 which connect the approximate middle of frame members 28—28 to side members 16—16. Frame members 28—28 are connected at their lower ends 30—30 to side members 16—16 and extend upwardly therefrom at an angle thereto. The angle between frame members 28—28 and side members 16—16 may vary from about 30 degrees to about 45 degrees. As can be seen in FIGS. 2 and 3, frame members 28—28 straddle the tree trunk.

Extending vertically upward from frame members 28—28 are threaded rod supports 32—32 and 34—34.

Threaded rod supports 32—32 and 34—34 rotatably receive and support threaded rods 36—36. Threaded rods 36—36 have threads thereon and have a handle 38 at the lower end thereof to enable the user of the stand to easily turn the threaded rods 36—36. Threaded rods 36—36 have a nut 38 thereon to hold the rods in rod supports 32—32 and 34—34.

A V-shaped blade 40 is threadably connected at each end thereof to threaded rods 36—36. V-shaped blade 40 14 is preferably constructed from a flat metal plate so that the rear edge will bite into and firmly grip a tree on which the stand is mounted. V-shaped blade 40 has internally threaded sleeves 42—42 connected at each end thereof in which threaded rods 36—36 are received. Internally threaded sleeves 42—42 preferably have bolts 44—44 connected thereto which are received in holes 46—46 of V-shaped blade 40. Nuts 48—48 are threaded onto bolts 44—44 to securely connect internally threaded sleeves 42—42 to V-shaped blade 40.

Therefore, V-shaped blade 40 can be moved closer to rod supports 34—34 as shown in FIG. 2 by rotating handles 38—38 in the appropriate direction, and V-shaped blade 40 can be moved closer to rod supports 32—32 as shown in FIG. 3 by rotating handles 38—38 in the appropriate direction. As can be seen in FIGS. 2 and 3, rear edge 14 and V-shaped blade 40 contact the tree trunk to hold stand 10 in a stationary position on the tree trunk.

If desired, two of the tree stands of the invention may be used to enable the user to climb a tree in a manner similar to that disclosed in U.S. Pat. No. 3,856,111, which is hereby incorporated by reference. The only additional item that need be added to the tree stand of the present invention to enable the user to climb with two of the tree stands of the invention would be a foot strap for the bottom tree stand 10 as shown in U.S. Pat. No. 3,856,111 at E. As the user climbs higher on the tree, and the tree trunk gets smaller in diameter, knobs 38—38 can be rotated to move blade 40 toward threaded rod supports 30—30.

Although the preferred embodiments of the present invention have been disclosed and described in detail above, it should be understood that the invention is in no sense limited thereby, and its scope is to be determined by that of the following claims:

What is claimed is:

1. A hunter's tree stand which is adjustable to fit tree trunks of various diameters comprising:
    a. platform means for supporting a hunter in the standing or sitting position, said platform means having a rear edge means for gripping a tree trunk,
    b. a pair of frame member means for straddling a tree trunk connected to said platform means,
    c. blade means for gripping a tree trunk, and
    d. rod means for moving said blade means away from and toward a tree trunk connected to said frame member means and said blade means.

2. The tree stand of claim 1 wherein said platform has floor means connected thereto for supporting a hunter in the standing or sitting position.

3. The tree stand of claim 1 wherein said rear edge of said platform means is V-shaped.

4. The tree stand of claim 2 wherein said rear edge of said platform means is a flat metal plate.

5. The tree stand of claim 1 wherein said platform means is generally rectangular in shape.

6. The tree stand of claim 5 wherein said platform means has two straight parallel side members connected by a straight transverse front edge member.

7. The tree stand of claim 6 wherein said rear edge connects said two straight parallel side members.

8. The tree stand of claim 6 wherein each of said frame member means are connected at one end to one of said straight parallel side members.

9. The tree stand of claim 8 wherein said frame member means is connected to said straight parallel side members by vertical member means.

10. The tree stand of claim 1 wherein said rod means comprises two rods having threads thereon.

11. The tree stand of claim 10 wherein each of said rods is rotatably connected to one of said frame member means by rod support means.

12. The tree stand of claim 10 wherein said blade means is connected to said two rods by sleeve means.

13. The tree stand of claim 12 wherein said sleeve means is generally cylindrical in shape.

14. The tree stand of claim 13 wherein said sleeve means has internal threads therein for threaded receipt of one of said rods.

15. The tree stand of claim 14 wherein each of said rods has handle means thereon for manually rotating said rods.

16. A hunter's tree stand which is adjustable to fit tree trunks of various diameters comprising:
 a. platform means for supporting a hunter in the standing or sitting position, said platform means having a rear edge means for gripping a tree trunk,
 b. a pair of frame member means for straddling a tree trunk connected to said platform means,
 c. blade means for gripping a tree trunk, said blade means having sleeve means connected thereto, said sleeve means having internal threads therein, and
 d. rod means for moving said blade means away from and toward a tree trunk connected to said frame member means and said blade means, said rod means having threads thereon, said rod means being received in said sleeve means.

17. The tree stand of claim 16 wherein said blade means grips a tree trunk on the opposite side of the tree trunk from where said rear edge means grips a tree trunk.

18. The tree stand of claim 17 wherein said platform means has floor means connected thereto for supporting a hunter in the standing or sitting position.

19. The tree stand of claim 17 wherein said rear edge of said platform means is V-shaped.

20. The tree stand of claim 17 wherein said rear edge of said platform means is a flat metal plate.

* * * * *